H. C. STEFFY.
COOLING CAN.
APPLICATION FILED JAN. 16, 1911.
996,033.
Patented June 20, 1911.
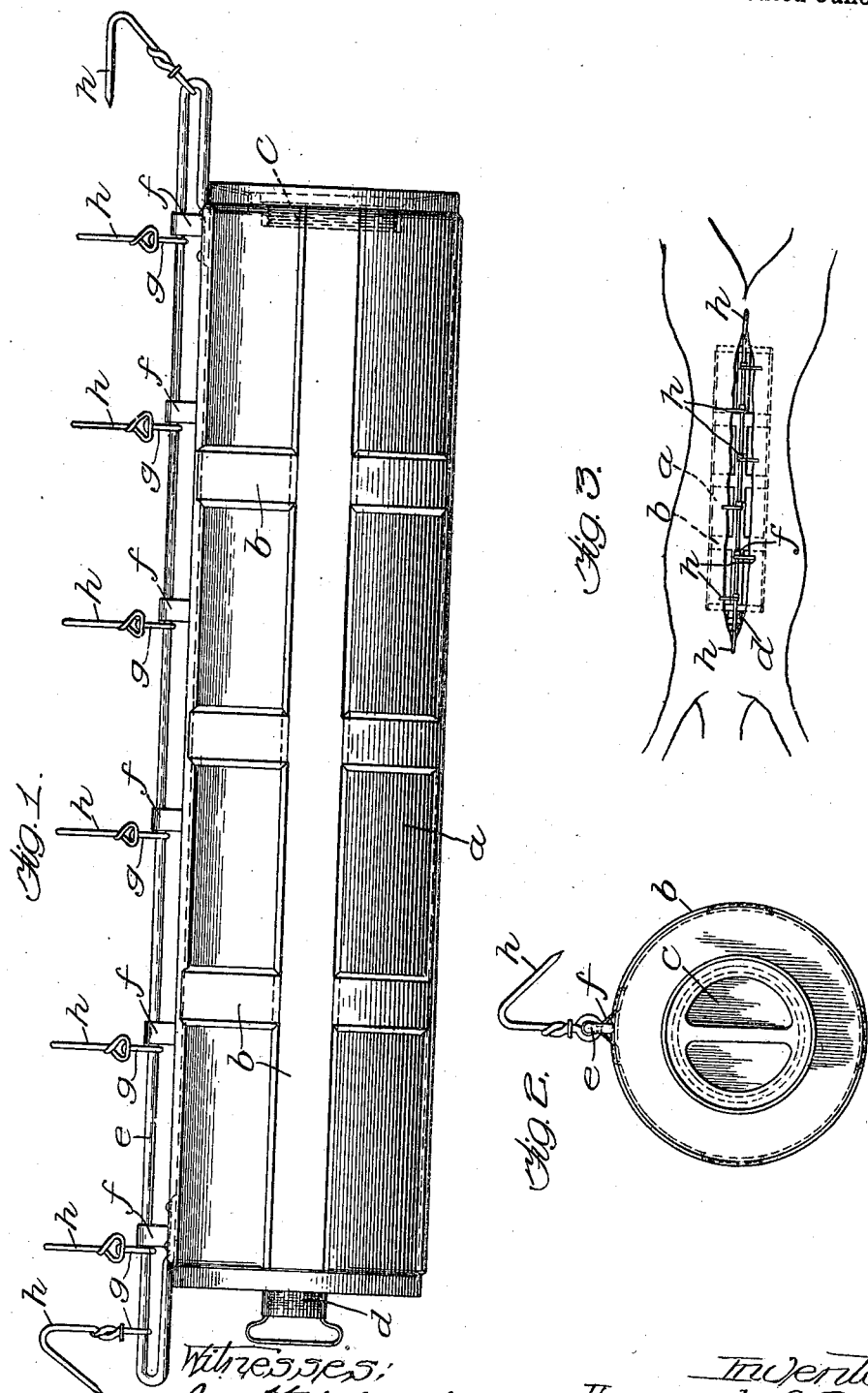

UNITED STATES PATENT OFFICE.

HERNANDO C. STEFFY, OF CHICAGO, ILLINOIS.

COOLING-CAN.

996,033.  Specification of Letters Patent.  Patented June 20, 1911.

Application filed January 16, 1911. Serial No. 602,993.

*To all whom it may concern:*

Be it known that I, HERNANDO C. STEFFY, a citizen of the United States, residing at Chicago, in the county of Cook and State of Illinois, have invented a certain new and useful Improvement in Cooling-Cans, of which the following is a specification.

My invention relates to cooling cans, and the object of the invention is to provide means whereby a can of this character may be self retaining within the carcass of a calf or other animal during shipment.

Ancillary to the main object it is my purpose to provide a can which may be readily filled and drained and which may be readily and safely secured in position within the carcass.

I obtain my objects by the mechanism illustrated in the accompanying drawings, in which—

Figure 1 is a side view of the complete apparatus. Fig. 2 is an end view thereof looking at the right end of Fig. 1. Fig. 3 is a view illustrating the position which the can occupies within the carcass during shipment.

Similar letters refer to similar parts throughout the several views.

The body $a$ of the can is preferably tubular in form and reinforced by strips $b$ of metal soldered or otherwise rigidly secured to the sides of the can. At one end the can is provided with a screw cap $c$ comparatively large in diameter in order that pieces of ice of considerable size may be introduced. A drain plug $d$ is provided at the other end of the can through which water may be drawn off as the ice melts.

Extending along the side of the can parallel thereto is a rod $e$ fastened to the can by lugs $f$. The parts are so proportioned that the rod lies a slight distance from the can, thereby accommodating the traveling rings $g$ which surround said rod. In the preferred construction said lugs are spaced equidistantly and there is a ring between each pair of lugs so that the travel of the rings is confined within a limited distance. Each ring is swivel connected to a hook $h$ adapted to engage the belly flaps of a carcass. In the form shown, the rod $e$ projects beyond the ends of the can to form a loop, the ends of the rod being brought back and secured to the body of the can, as shown. The end hooks supported on these loops assist in closing the carcass over the can at the ends thereof and also serve efficiently to prevent longitudinal movement of the can within the carcass.

It will be understood that it is common practice to ship calves and other animals intended for the butcher by ordinary express where no refrigerating facilities are provided. The carcasses are shipped with the hides on, which protects them to a certain extent, but not sufficiently.

In using my device, the can is first filled with ice or other cooling substance or mixture, and is then introduced into the carcass in the manner indicated in Fig. 3. The flaps of the carcass are then brought together over the can and held in position by the hooks $h$ which are preferably pointed in alternate directions, as indicated. The end hooks are pointed toward the head and tail of the carcass, the result being that the can is not completely inclosed but is prevented from displacement within the carcass. As the can and its contents are so well protected from the heat of the atmosphere the inside of the carcass is maintained at or near a freezing temperature for a long period of time without any attention whatever. The outside of the carcass is largely protected by the hide, while the inside, which is the most susceptible to the action of heat, is kept at a very low temperature. The body of the carcass acts as an insulator to prevent the escape of heat. Accordingly carcasses in this condition may be a long time in transit without deteriorating in very hot weather.

Having thus described my invention, what I claim as new and desire to secure by Letters Patent is:—

1. A cooling can having a rod secured thereto and arranged longitudinally at the side thereof a slight distance therefrom, and a hook secured to said rod and slidable thereon lengthwise thereof.

2. A cooling can having a rod extending along one side thereof a slight distance therefrom, hooks slidingly mounted on said rod, and means for limiting the travel of said hooks.

3. In combination, a tubular cooling can, provided with a filler cap through which a cooling substance may be introduced, a guide rod secured to the side of the can a slight distance therefrom and extending parallel thereto, a plurality of hooks slidable on said rod, and spacing means arranged at intervals lengthwise of the rod for limiting the travel of the respective hooks upon the rod.

4. In combination, a cooling can, a guide rod secured to the side thereof a slight distance therefrom, said rod projecting beyond the ends of the can and the projecting ends being looped, hooks at the looped end of the rod and other hooks intermediate of said loops, said hooks being adapted to engage the belly flaps of a carcass.

5. In combination, a tubular cooling can provided with a filler cap through which a cooling substance may be introduced, a guide rod secured to the side of the can a slight distance therefrom and extending parallel thereto, said rod projecting beyond the ends of the can and being brought back to the can to form loops, swivel hooks slidingly mounted upon said rod at the looped ends and points intermediate thereof, and lugs extending from the can to the rod at intervals and adapted to limit the amount of travel of the hooks upon the rod.

In witness whereof, I have hereunto subscribed my name in the presence of two witnesses.

HERNANDO C. STEFFY.

Witnesses:
 HOWARD M. COX,
 MARGARET D. ROBB.

Copies of this patent may be obtained for five cents each, by addressing the "Commissioner of Patents, Washington, D. C."